US012221307B2

(12) United States Patent
Ooi et al.

(10) Patent No.: US 12,221,307 B2
(45) Date of Patent: Feb. 11, 2025

(54) PAPER SHEET STORAGE DEVICE

(71) Applicant: TOSHIBA TEC KABUSHIKI KAISHA, Tokyo (JP)

(72) Inventors: In Seng Ooi, Singapore (SG); Kock Kuan Tan, Singapore (SG); Kuan Guan Lor, Singapore (SG); Chee Wai Chua, Singapore (SG); Kiyotaka Nihashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 17/525,997

(22) Filed: Nov. 15, 2021

(65) Prior Publication Data

US 2022/0242687 A1 Aug. 4, 2022

(30) Foreign Application Priority Data

Feb. 2, 2021 (JP) ................................ 2021-014733

(51) Int. Cl.

*B65H 16/02* (2006.01)
*B41J 15/04* (2006.01)
*B65H 26/08* (2006.01)

(52) U.S. Cl.

CPC .............. *B65H 16/02* (2013.01); *B41J 15/04* (2013.01); *B41J 15/042* (2013.01); *B65H 16/028* (2013.01); *B65H 26/08* (2013.01)

(58) Field of Classification Search

CPC ...... B65H 16/02; B65H 16/028; B65H 16/08; B65H 16/106; B65H 23/005;

(Continued)

(56) References Cited

U.S. PATENT DOCUMENTS 5,030,968 A * 7/1991 Benson .................. B41J 25/316 346/33 ME
5,820,068 A * 10/1998 Hosomi ................... B41J 11/70 242/563.2

(Continued)

FOREIGN PATENT DOCUMENTS

CN 201872418 U * 6/2011 ............ B41J 15/042
CN 208914817 U * 5/2019 ............ B41J 15/042

(Continued)

OTHER PUBLICATIONS

JPH04117868U Translation; "A Roll Paper Exhaustion Detection Device"; Publication Date: Oct. 21, 1992; Published By; Espacenet ( Year: 1991).*

(Continued)

*Primary Examiner* — Michael R Mansen
*Assistant Examiner* — Raveen J Dias
(74) *Attorney, Agent, or Firm* — Amin, Turocy & Watson, LLP

(57) ABSTRACT

In general, according to one embodiment, a paper sheet storage device that is capable of accurately detecting a near end of a stored roll paper sheet is provided. A paper sheet storage device in an embodiment includes a storage unit configured to store a roll paper sheet obtained by winding a long paper sheet, a near end detection unit configured to detect a near end since a diameter of the roll paper sheet stored in the storage unit becomes smaller, and a pressing unit configured to press the roll paper sheet stored in the storage unit in a direction of the near end detection unit.

18 Claims, 6 Drawing Sheets

(58) Field of Classification Search

CPC .. B65H 26/063; B65H 26/08; B65H 2801/00; B65H 2801/03; B65H 2801/06; B65H 2801/09; B65H 2801/12; B65H 2801/15; B65H 2801/18; B65H 2801/21; B41J 15/00; B41J 15/02; B41J 15/04; B41J 15/042; B41J 15/044; B41J 15/046; B41J 15/06; B41J 11/0095

See application file for complete search history.

(56) References Cited

U.S. PATENT DOCUMENTS

| | | | | | |
|---|---|---|---|---|---|
| 5,884,861 | A * | 3/1999 | Hosomi | B41J 29/48 | 242/563 |
| 5,943,085 | A * | 8/1999 | Higashi | B41J 11/706 | 347/171 |
| 5,980,138 | A * | 11/1999 | Shiozaki | B41J 11/42 | 400/582 |
| 6,068,419 | A * | 5/2000 | Shiozaki | B41J 3/4075 | 400/582 |
| 6,109,804 | A * | 8/2000 | Higashi | B41J 3/4075 | 242/402 |
| 6,345,782 | B1 * | 2/2002 | Nakayama | B41J 15/042 | 400/607.2 |
| 7,832,680 | B2 * | 11/2010 | Yokoyama | B41J 15/04 | 242/566 |
| 8,113,458 | B2 * | 2/2012 | Chaussade | B41J 15/042 | 242/563.2 |
| 8,240,929 | B2 * | 8/2012 | Kohyama | B65H 23/34 | 400/613 |
| 9,039,312 | B2 * | 5/2015 | Ohnishi | B41J 15/042 | 400/613 |
| 9,193,191 | B2 * | 11/2015 | Sekino | B41J 15/042 | |
| 9,469,128 | B2 * | 10/2016 | Ishimori | B41J 15/042 | |
| 9,688,085 | B2 * | 6/2017 | Yada | B41J 2/32 | |
| 9,724,947 | B2 * | 8/2017 | Yada | B41J 29/13 | |
| 9,975,362 | B1 * | 5/2018 | Kobayashi | B41J 11/0045 | |
| 10,040,303 | B2 * | 8/2018 | Takabatake | B41J 29/13 | |
| 10,059,133 | B2 * | 8/2018 | Chiba | B41J 29/02 | |
| 10,457,515 | B2 * | 10/2019 | Hagi | B41J 11/0005 | |
| 10,556,454 | B2 * | 2/2020 | Yada | B65H 23/08 | |
| 10,807,822 | B2 * | 10/2020 | Yamaya | B65H 19/10 | |
| 10,960,691 | B2 * | 3/2021 | Yazawa | B41J 15/042 | |
| 11,370,239 | B2 * | 6/2022 | Yada | B41J 15/042 | |
| 11,472,655 | B2 * | 10/2022 | Huang | B65H 16/005 | |
| 2003/0160121 | A1 * | 8/2003 | Kayanuma | B65H 16/06 | 242/348.3 |
| 2007/0091159 | A1 * | 4/2007 | Chaussade | B41J 15/042 | 347/108 |
| 2008/0003040 | A1 * | 1/2008 | Sekino | B41J 3/60 | 400/188 |
| 2008/0135673 | A1 * | 6/2008 | Sato | B65H 16/02 | 242/590 |
| 2008/0267682 | A1 * | 10/2008 | Osawa | B41J 15/042 | 400/120.16 |
| 2008/0310903 | A1 * | 12/2008 | Kohyama | B41J 11/0045 | 400/613 |
| 2009/0085282 | A1 * | 4/2009 | Yokoyama | B41J 15/042 | 271/226 |
| 2011/0170929 | A1 * | 7/2011 | Nakayama | B41J 15/042 | 242/550 |
| 2012/0055272 | A1 * | 3/2012 | Sanada | B41J 15/042 | 73/865.8 |
| 2012/0224017 | A1 * | 9/2012 | Nihashi | B41J 11/0075 | 347/221 |
| 2012/0224904 | A1 * | 9/2012 | Nihashi | B41J 15/042 | 242/563.2 |
| 2012/0224905 | A1 * | 9/2012 | Nihashi | B65H 26/08 | 400/583 |
| 2012/0257222 | A1 * | 10/2012 | Jiang | B41J 29/13 | 358/1.5 |
| 2013/0056512 | A1 * | 3/2013 | Suzuki | B41J 15/02 | 226/196.1 |
| 2013/0082133 | A1 * | 4/2013 | Watanabe | B41J 15/042 | 242/566 |
| 2013/0161369 | A1 * | 6/2013 | Chen | B65H 20/02 | 226/49 |
| 2013/0293655 | A1 * | 11/2013 | Sekino | B41J 13/02 | 347/104 |
| 2014/0255075 | A1 * | 9/2014 | Ohnishi | B41J 15/16 | 400/613 |
| 2016/0207332 | A1 * | 7/2016 | Ishimori | B41J 15/042 | |
| 2017/0072717 | A1 * | 3/2017 | Yada | B41J 29/02 | |
| 2017/0080722 | A1 * | 3/2017 | Yada | B65H 16/08 | |
| 2017/0121142 | A1 * | 5/2017 | Hagi | B41J 15/04 | |
| 2017/0259594 | A1 * | 9/2017 | Chiba | B41J 29/13 | |
| 2018/0043713 | A1 * | 2/2018 | Takabatake | B41J 29/02 | |
| 2018/0104967 | A1 * | 4/2018 | Yada | B41J 15/04 | |
| 2018/0272765 | A1 * | 9/2018 | Iwamoto | B41J 11/70 | |
| 2019/0118570 | A1 * | 4/2019 | Kato | D21H 21/48 | |
| 2019/0241390 | A1 * | 8/2019 | Huang | B65H 16/02 | |
| 2019/0291481 | A1 * | 9/2019 | Yazawa | B65H 23/085 | |
| 2020/0189299 | A1 * | 6/2020 | Yada | B65H 16/02 | |
| 2020/0198375 | A1 * | 6/2020 | Wong | B41J 3/4075 | |
| 2020/0269614 | A1 * | 8/2020 | Matsui | B41J 3/4075 | |
| 2022/0097421 | A1 * | 3/2022 | Matsunaga | B41J 15/00 | |
| 2022/0242139 | A1 * | 8/2022 | Sanada | B41J 2/335 | |
| 2022/0281243 | A1 * | 9/2022 | Ooi | B41J 15/042 | |
| 2022/0299930 | A1 * | 9/2022 | Daimon | B65H 16/06 | |
| 2022/0355599 | A1 * | 11/2022 | Hirama | B41J 11/70 | |
| 2023/0091312 | A1 * | 3/2023 | Kashiwabara | B65H 16/028 | 400/611 |
| 2023/0096784 | A1 * | 3/2023 | Okada | B41J 15/042 | 271/3.14 |
| 2023/0143445 | A1 * | 5/2023 | Ooi | B41J 11/703 | 400/621 |
| 2023/0166935 | A1 * | 6/2023 | Ishida | B41J 11/0075 | 242/570 |

FOREIGN PATENT DOCUMENTS

| | | | | |
|---|---|---|---|---|
| JP | 02-064556 | | 5/1990 | |
| JP | 04-117868 | | 10/1992 | |
| JP | 09-295436 | | 11/1997 | |
| JP | 2983453 | B2 * | 11/1999 | B65H 2301/4137 |
| JP | 2018-008468 | | 1/2018 | |
| WO | WO-2020240973 | A1 * | 12/2020 | B65H 16/02 |

OTHER PUBLICATIONS

Chinese Office Action for Chinese Patent Application No. 202111319630.1 dated Nov. 1, 2023.

Japanese Office Action for Japanese Patent Application No. 2021-014733 dated Aug. 13, 2024.

Japanese Office Action for Japanese Patent Application No. 2021-014733 dated Nov. 19, 2024.

* cited by examiner

PAPER SHEET STORAGE DEVICE

CROSS-REFERENCE TO RELATED APPLICATION

This application is based upon and claims the benefit of priority from Japanese Patent Application No. 2021-014733, filed on Feb. 2, 2021, the entire contents of which are incorporated herein by reference.

FIELD

Embodiments described herein relate to a paper sheet storage device, a paper sheet processing method, and a thermal printer.

BACKGROUND

In related art, for example, a paper sheet storage device used as a printer stores a roll paper sheet (a paper sheet obtained by winding a long paper sheet in a roll shape) and pulls out the paper sheet from the roll paper sheet to print.

For ease of use, a drop-in type roll paper sheet that is not pivotally supported may be used as such a roll paper sheet. In this case, the roll paper sheet stored inside the paper sheet storage device may be curled in various directions (hereinafter, referred to as "the roll paper sheet is curled") due to a reaction of pulling out the wound long paper sheet. The roll paper sheet is more likely to curl when the roll paper sheet becomes lighter as a diameter of the roll paper sheet becomes smaller.

In the paper sheet storage device, a near end of the roll paper sheet is detected by a near end sensor. However, the accurate detection of the near end of the roll paper sheet may not be easy since the roll paper sheet is curled.

DETAILED DESCRIPTION

In general, according to one embodiment, a paper sheet storage device that is capable of accurately detecting a near end of a stored roll paper sheet is provided.

A paper sheet storage device according to an embodiment includes a storage unit configured to store a roll paper sheet obtained by winding a long paper sheet, a near end detection unit configured to detect a near end since a diameter of the roll paper sheet stored in the storage unit becomes smaller than a threshold diameter, and a pressing unit configured to press the roll paper sheet stored in the storage unit in a direction of the near end detection unit. According to another embodiment, a paper sheet processing method involves detecting a near end of a roll paper sheet comprising a wound long paper sheet stored in a storage component as a diameter of the roll paper sheet decreases; and pressing the roll paper sheet stored in the storage component in a direction of the detecting.

An embodiment of a paper sheet storage device is described below with reference to the drawings. In the embodiment described below, a printer is described as an example of the paper sheet storage device. The embodiment described below does not limit a configuration, a specification, and the like of the paper sheet storage device.

Figure 1:
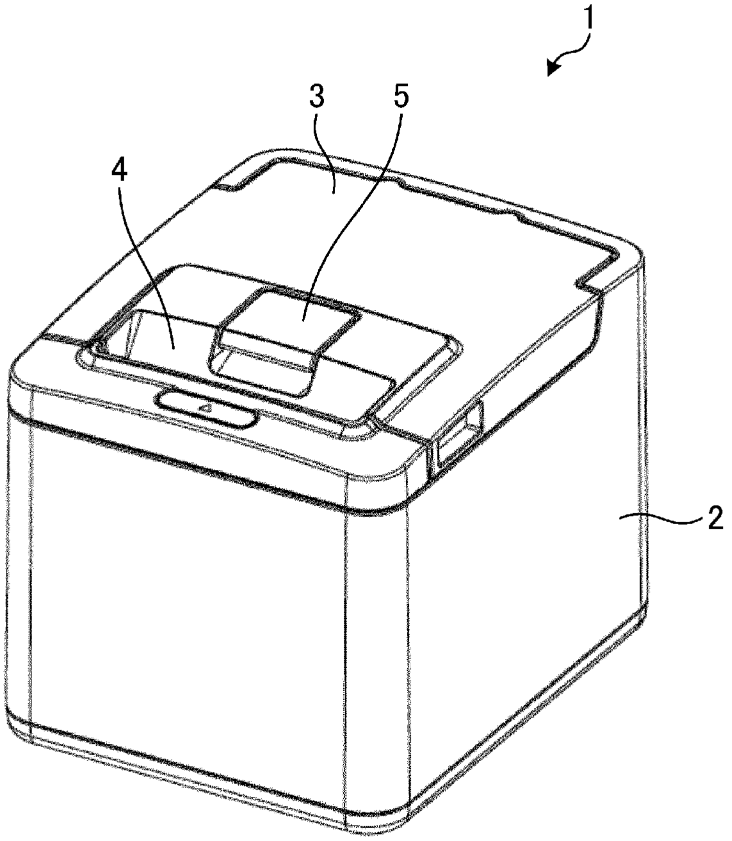
FIG. 1 is a perspective view illustrating an example of an appearance configuration of a printer according to an embodiment.

FIG. 1 is a perspective view illustrating an example of an appearance configuration of a printer 1 according to an embodiment. The printer 1 is, for example, a thermal printer that pulls out a roll paper sheet (for example, a thermal paper sheet, refer to FIG. 2) stored inside the thermal printer and prints information such as a character and a figure on a surface of a paper sheet. The printer 1 is connected to, for example, a point of sales (POS) terminal (not shown), receives merchandise information, sales information, and the like related to a merchandise sold to a customer in a store from the POS terminal, and prints the merchandise information, sales information, and the like on the paper sheet.

As illustrated in FIG. 1, the printer 1 includes a housing 2 and a lid 3. The housing 2 has a hollow box shape and is capable of storing the roll paper sheet inside the housing 2. The lid 3 is pivotally supported with respect to the housing 2, and the printer 1 is capable of being opened and closed by rotating the lid 3 about a fulcrum. The lid 3 includes an opening and closing unit 5, and the lid 3 is capable of being opened and closed with respect to the housing 2 by operating the opening and closing unit 5. The roll paper sheet is stored (dropped) in the housing 2 in a state in which the lid 3 is opened. The printer 1 pulls out the stored roll paper sheet, prints information, and dispenses the roll paper sheet as a receipt from a dispensing port 4.

Figure 2:
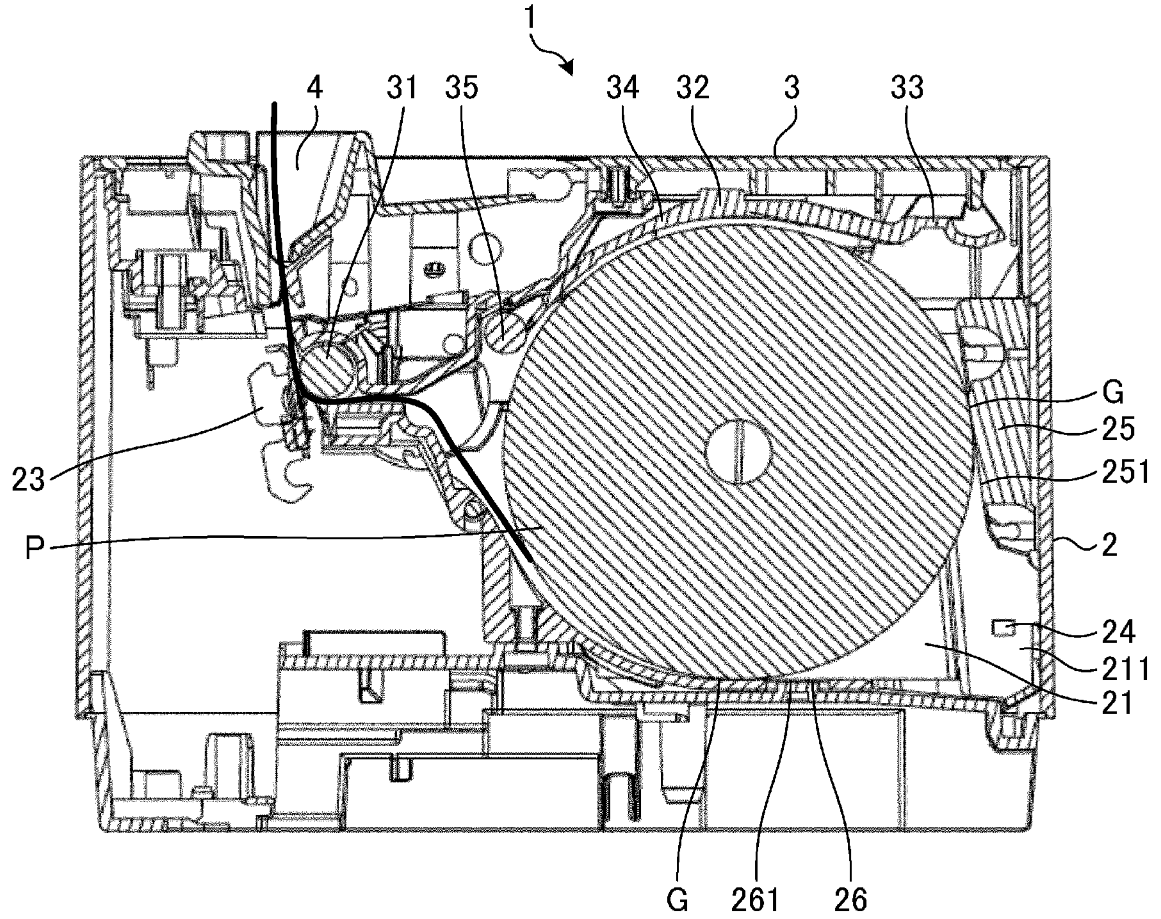
FIG. 2 is a cross-sectional view illustrating the printer according to the embodiment in a state in which a lid is closed.
Figure 3:
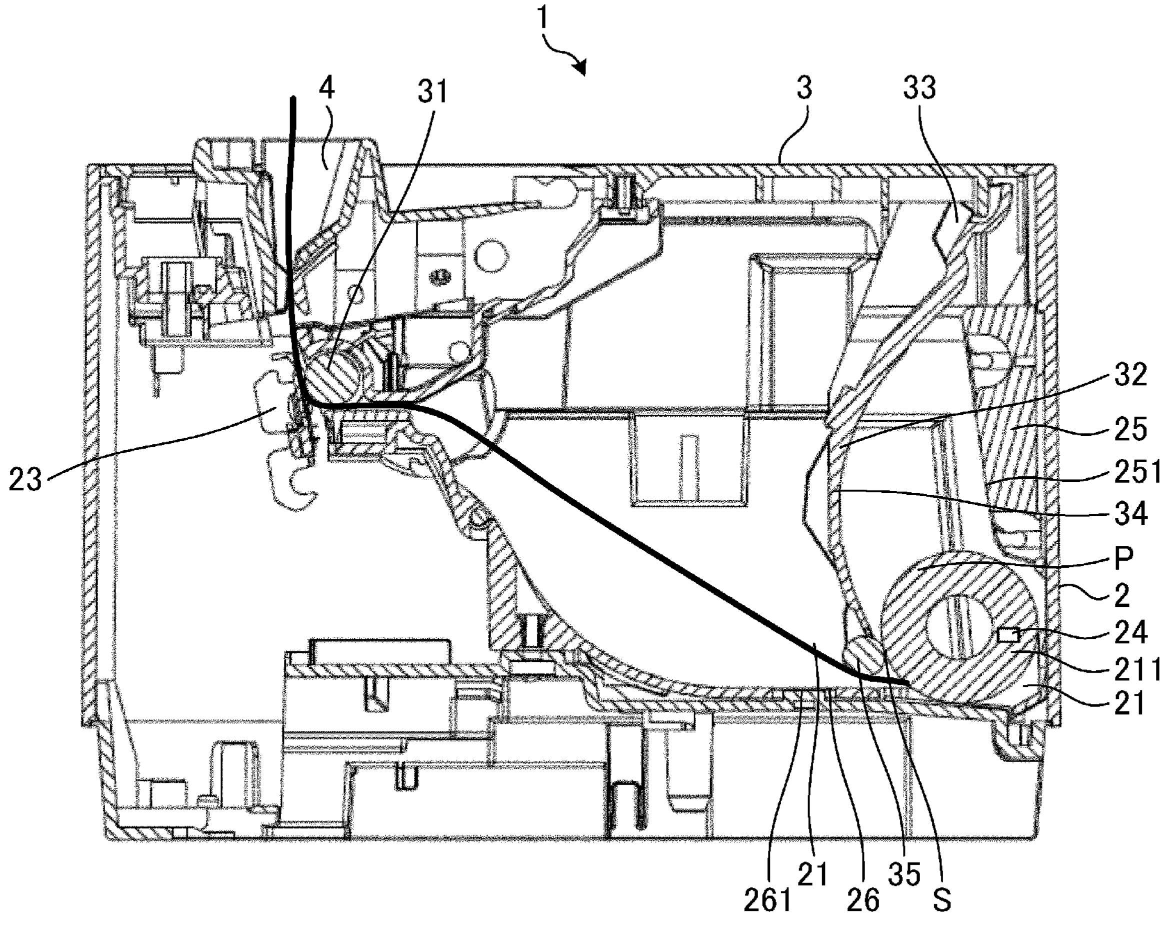
FIG. 3 is a cross-sectional view illustrating the printer according to the embodiment in a state in which a diameter of a roll paper sheet becomes smaller.

FIGS. 2 and 3 are cross-sectional views illustrating the printer 1 according to the embodiment in a state in which the lid 3 is closed. FIG. 2 is a cross-sectional view illustrating the printer 1 according to the embodiment in a state in which the lid 3 is closed. FIG. 3 is a cross-sectional view illustrating the printer 1 according to the embodiment in a state in which a diameter of the roll paper sheet is small. In FIGS. 2 and 3, the printer 1 is in a flatly placed state. In FIG. 2, a storage unit 21 is provided inside the housing 2. The storage unit 21 has a space in which a roll paper sheet P is capable of being stored. The lid 3 is opened and closed with respect to the housing 2, so that the storage unit 21 is opened and closed.

The roll paper sheet P is a paper sheet having a substantially cylinder shape obtained by winding a long thermal paper sheet, and the paper sheet is pulled out from an outer peripheral portion at a winding end part. A diameter of the roll paper sheet P gradually becomes smaller as the paper sheet is pulled out.

The storage unit 21 stores the roll paper sheet P in a state in which the lid 3 is opened. The roll paper sheet P stored in the storage unit 21 is not fixed, for example, pivotally supported in the storage unit 21 (drop-in type), and is capable of freely moving in the space in the storage unit 21.

The storage unit 21 includes a wall portion 25 and a wall portion 26. The wall portion 25 includes a surface 251. The wall portion 26 includes a surface 261. The wall portion 25 and the wall portion 26 face each other such that the surface

251 and the surface 261 form an acute angle with each other. The wall portion 25 and the wall portion 26 support the roll paper sheet P stored in the storage unit 21 by the surface 251 and the surface 261 abutting against an outer peripheral surface G of the roll paper sheet P.

A pressing unit 32 is provided on the housing 2. The pressing unit 32 includes a shaft 33 pivotally supported on the housing 2 and is rotatable with respect to the housing 2 about the shaft 33. The pressing unit 32 includes a flapper 34 that extends from the shaft 33, and a roller 35 that is provided at a tip portion of the flapper 34 and is formed of a metal having a predetermined weight that implements a function as a weight. The flapper 34 has a curve along the outer peripheral surface G of the roll paper sheet P that has a large diameter and that is just stored in the storage unit 21, and is disposed along the outer peripheral surface G of the roll paper sheet P. The roller 35 is rotatable with respect to the flapper 34.

Since the roller 35 may have a predetermined weight, the pressing unit 32 rotates toward the roll paper sheet P side (toward a lower side in FIG. 2) under an own weight of the pressing unit 32 about the shaft 33 (or may rotate toward a roll paper sheet P side by being urged from the lid 3 to the roll paper sheet P side) in the state in which the lid 3 is closed. Therefore, the flapper 34 of the pressing unit 32 abuts against the outer peripheral surface G of the roll paper sheet P having a large diameter. The roller 35 does not abut against the outer peripheral surface G of the roll paper sheet P while the diameter of the roll paper sheet P is large. However, if the diameter of the roll paper sheet P becomes smaller than a predetermined value, the roller 35 abuts against the outer peripheral surface G of the roll paper sheet P. In this state, the flapper 34 does not abut against the outer peripheral surface G of the roll paper sheet P. If the diameter of the roll paper sheet P becomes smaller than the predetermined value (threshold diameter), the roller 35 has a function of assisting the separation when the paper sheet from the roll paper sheet P is pulled out and a function as a guide for conveying the pulled out paper sheet in a direction of a print head 23.

The print head 23 is provided inside the housing 2. The print head 23 is provided at a substantially intermediate position between the storage unit 21 and the dispensing port 4 and is provided in the middle of a conveyance path of the paper sheet pulled out from the roll paper sheet P. The print head 23 is a line thermal head in which a large number of heat generating elements are disposed on a line. A platen 31 is provided on the lid 3.

The platen 31 has a rubber-shaped cylinder shape, and is rotatably attached to the lid 3. If the lid 3 is in a closed state with respect to the housing 2, the platen 31 is located at a position facing the print head 23 and presses the print head 23. The paper sheet pulled out from the roll paper sheet P is sandwiched by the print head 23 and the platen 31, and the platen 31 is rotated by a drive unit (not shown), so that the paper sheet is pulled out from the roll paper sheet P, and the sandwiched paper sheet is conveyed toward the dispensing port 4. The print head 23 applies heat to the paper sheet to be conveyed by selectively generating heat from the heat generating elements aligned on one line, and prints information. The printed paper sheet is discharged to the outside from the dispensing port 4. As the paper sheet is pulled out from the roll paper sheet P, printed, and discharged to the outside from the dispensing port 4, the diameter of the roll paper sheet P gradually becomes smaller.

The platen 31 is separated from the print head 23 by opening the lid 3, thereby opening the conveyance path of the paper sheet. Therefore, the lid 3 is capable of being opened, and the paper sheet is capable of being pulled out from the roll paper sheet P stored in the storage unit 21 and is capable of being easily set between the print head 23 and the platen 31.

A near end detection unit 24 is provided on the storage unit 21. The near end detection unit 24 is formed of, for example, a transmission type optical sensor that executes different outputs depending on whether the light emitted from the light emitting unit is received. The near end detection unit 24 is capable of detecting the roll paper sheet P located at a deepest portion 211 of the storage unit 21. The deepest portion 211 is the deepest position in a direction of gravity in the storage unit 21. The near end detection unit 24 detects, by detecting an outer periphery S of the roll paper sheet P located at the deepest portion 211, the near end indicating that the remaining amount of the paper sheet wound around the roll paper sheet P is low.

An extension line of the surface 251 of the wall portion 25 and an extension line of the surface 261 of the wall portion 26 both extend in a direction of the near end detection unit 24. That is, the near end detection unit 24 is located substantially in an extension direction of the surface 251, and the near end detection portion 24 is located substantially in an extension direction of the surface 261. Preferably, the surface 251 and the surface 261 are provided at an acute angle smaller than 90°. The near end detection unit 24 is located near an intersection of the extension line of the surface 251 and the extension line of the surface 261. Therefore, if the diameter of the roll paper sheet P becomes smaller, the roll paper sheet P moves along the surface 251 and the surface 261 in a direction of approaching the near end detection unit 24 as shown in FIG. 3. That is, as the diameter of the roll paper sheet P becomes smaller, the roll paper sheet P moves in a direction of the deepest portion 211. The outer periphery S of the moved roll paper sheet P is eventually detected by the near end detection unit 24. By detecting the outer periphery S of the roll paper sheet P, the near end detection unit 24 detects the near end of the roll paper sheet P. That is, the fact that the outer periphery S of the roll paper sheet P is detected by the near end detection unit 24 indicates that the diameter of the roll paper sheet P is fairly small, and the remaining amount of the paper sheet wound around the roll paper sheet P is low.

The above-described pressing unit 32 presses the roll paper sheet P in the direction of the near end detection unit 24. Specifically, as shown in FIG. 2, the flapper 34 abuts against the outer peripheral surface G of the roll paper sheet P while the diameter of the roll paper sheet P is large, so that the pressing unit 32 presses the roll paper sheet P in the direction of the near end detection unit 24. Therefore, even if the roll paper sheet P is the drop-in type and is movable in the storage unit 21, and the roll paper sheet P is curled when the paper sheet is pulled out from the roll paper sheet P, curling of the roll paper sheet P is minimized since the pressing unit 32 presses the roll paper sheet P in the direction of the near end detection unit 24. Therefore, the paper sheet is capable of being smoothly pulled out from the roll paper sheet P.

As shown in FIG. 3, as the diameter of the roll paper sheet P becomes smaller, the roll paper sheet P is pressed under an own weight of the roll paper sheet P and by the flapper 34, is guided by the surface 251 and the surface 261, and is gradually moved in the direction of the deepest portion 211 of the storage unit 21, that is, in the direction of the near end detection unit 24. If the diameter of the roll paper sheet P becomes smaller than the predetermined value, the roller 35 abuts against the outer peripheral surface G of the roll paper sheet P to press the roll paper sheet P in the direction of the near end detection unit 24. Therefore, even if the roll paper sheet P is the drop-in type and is freely movable in the storage unit 21, and the roll paper sheet P is curled when the paper sheet is pulled out from the roll paper sheet P, curling of the roll paper sheet P is minimized since the pressing unit 32 (roller 35) presses the roll paper sheet P in the direction of the near end detection unit 24. Therefore, the near end detection unit 24 is capable of accurately detecting the roll paper sheet P, and the accuracy with which the near end detection unit 24 detects the near end of the roll paper sheet P is capable of being improved.

Figure 4:
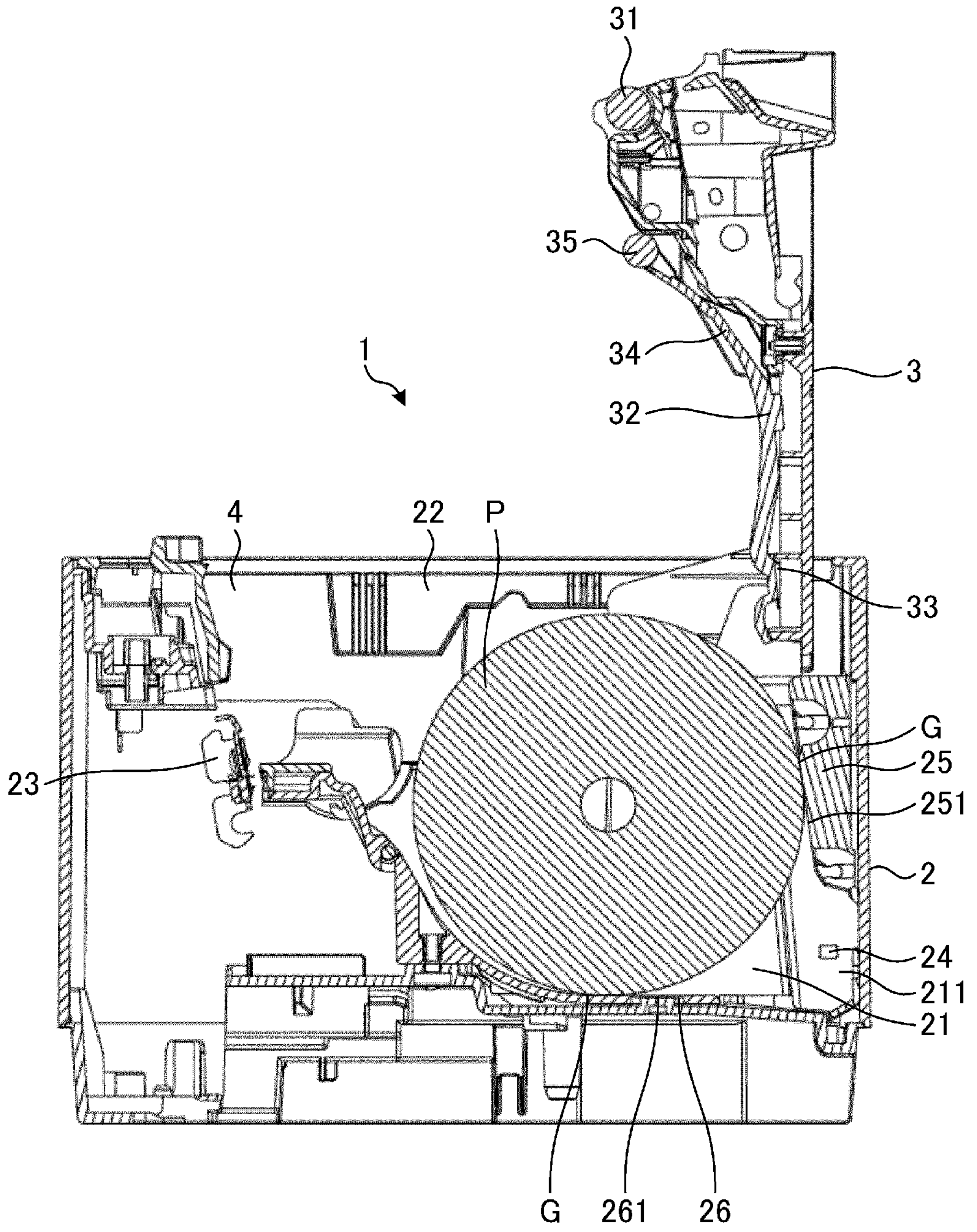
FIG. 4 is a cross-sectional view illustrating the printer according to the embodiment in a state in which the lid is opened.

FIG. 4 illustrates a state in which the lid 3 is rotated upward from the housing 2 to open an opening portion 22 of the housing 2 in the printer 1 serving as the paper sheet storage device according to the embodiment. FIG. 4 is a view in which the lid 3 is rotated by approximately 90°. If the lid 3 is opened, the pressing unit 32 provided in the housing 2 rotates upward as the lid 3 is opened. That is, if the lid 3 is opened upward, the opened lid 3 abuts against the pressing portion 32 near the shaft 33 and acts, so that the pressing unit 32 rotates upward about the shaft 33 in response to the upward opening of the lid 3. Therefore, the pressing unit 32 (specifically, the flapper 34 or the roller 35) is separated from the outer periphery S of the roll paper sheet P.

The platen 31 is separated from the print head 23 and moves upward as the lid 3 is opened. In this state, the pressing unit 32 does not press the roll paper sheet P. When the roll paper sheet P is replaced and replenished, the new roll paper sheet P is supplied from the opening portion 22. The supplied roll paper sheet P is positioned such that the outer peripheral surface G abuts against the surface 251 of the wall portion 25 and the surface 261 of the wall portion 26. Then, the paper sheet is pulled out from the roll paper sheet P and is set between the print head 23 and the platen 31. Thereafter, when the lid 3 is closed, the paper sheet is sandwiched between the print head 23 and the platen 31. The flapper 34 of the pressing unit 32 presses the roll paper sheet P in the direction of the near end detection unit 24.

From here, an attachment position of the near end detection unit 24 and the deepest portion 211 are described. As illustrated in FIG. 3, in a state in which the printer 1 is flatly placed, the lowest position of the storage unit 21 is the deepest portion 211. In the storage unit 21, the roll paper sheet P whose diameter becomes smaller is guided by the surface 251 and the surface 261 and moves. The near end detection unit 24 is attached near the deepest portion 211. Therefore, the near end detection unit 24 detects the roll paper sheet P moved to the deepest portion 211.

Figure 5:
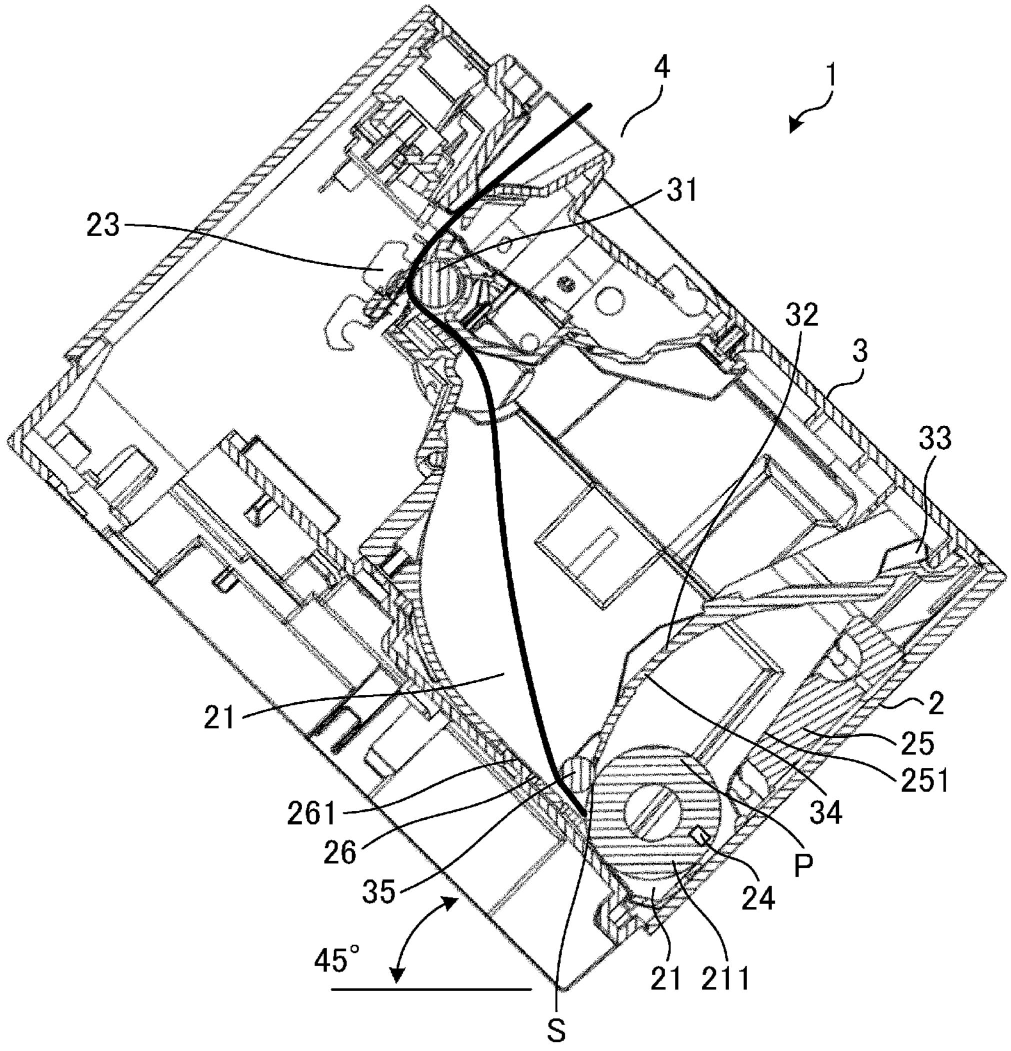
FIG. 5 is a cross-sectional view illustrating a state in which the printer according to the embodiment is obliquely set.

The printer 1 may be obliquely provided depending on a use environment. FIG. 5 shows a state in which the printer 1 is provided in a table shape inclined by approximately 45°, for example. In this state, all configurations of the printer 1 are inclined by 45° from the flatly placed state (states in FIGS. 2 and 3). However, even in the state in which the printer 1 is inclined by 45°, the near end detection unit 24 is still located near the deepest portion 211 of the storage unit 21. Therefore, even in this state, the roll paper sheet P whose diameter becomes smaller is guided by the surface 251 and the surface 261, is pressed under the own weight of the roll paper sheet P and by the roller 35, and moves to the deepest portion 211 of the storage unit 21. Therefore, even if the printer 1 is inclined by 45°, the near end detection unit 24 detects the roll paper sheet P moved to the deepest portion 211. Even if the paper sheet is pulled out from the roll paper sheet P located at the deepest portion 211, curling of the roll paper sheet P is minimized. Therefore, the near end detection unit 24 is capable of accurately detecting the near end of the roll paper sheet P.

Figure 6:
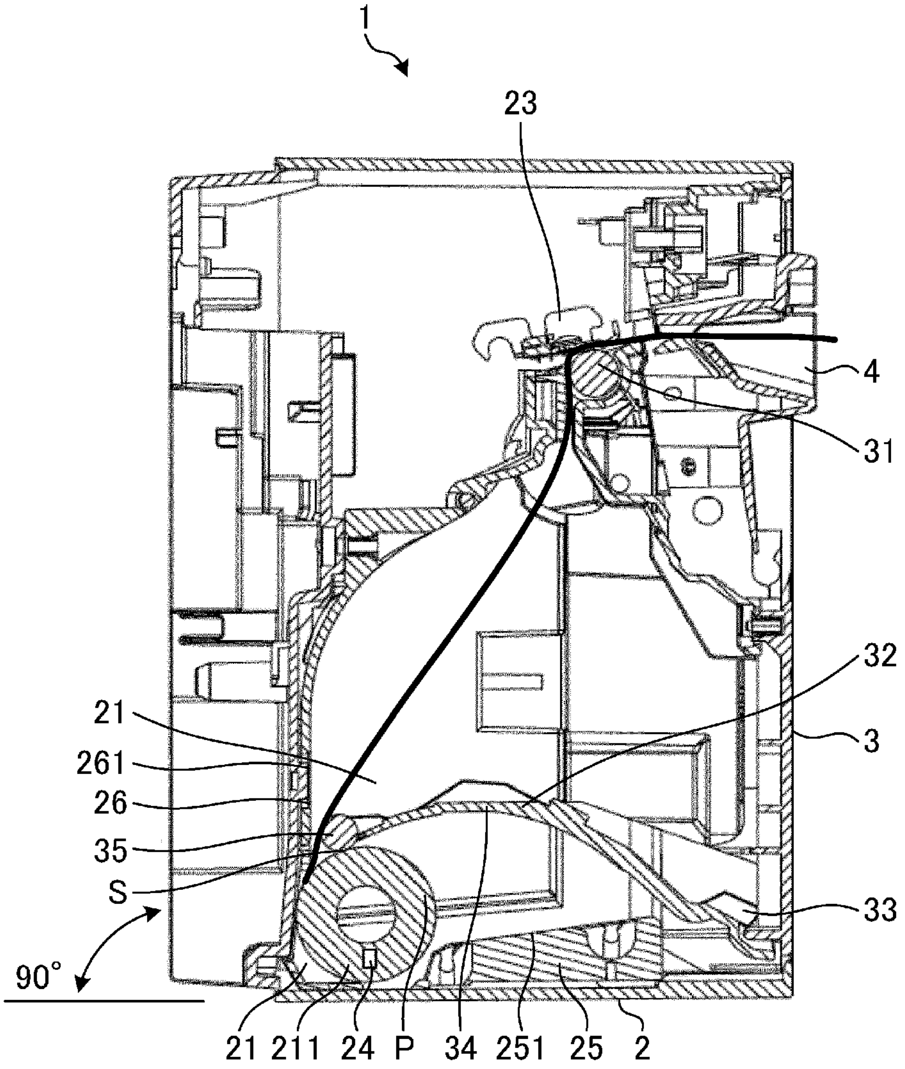
FIG. 6 is a cross-sectional view illustrating a state in which the printer according to the embodiment is set upright.

The printer 1 may be vertically provided depending on the use environment. FIG. 6 illustrates a state (vertically placed state) in which the printer 1 is hung on a wall inclined by 90°, for example. In this state, all the components of the printer 1 are inclined by 90° from the flatly placed state (states in FIGS. 2 and 3). However, even in the state in which the printer 1 is inclined by 90°, the near end detection unit 24 is still located near the deepest portion 211 of the storage unit 21. Therefore, even in this state, the roll paper sheet P whose diameter becomes smaller is guided by the surface 251 and the surface 261, is pressed under the own weight of the roll paper sheet P and by the roller 35, and moves to the deepest portion 211 of the storage unit 21. Therefore, even if the printer 1 is inclined by 90°, the near end detection unit 24 detects the roll paper sheet P moved to the deepest portion 211. Even if the paper sheet is pulled out from the roll paper sheet P located at the deepest portion 211, curling of the roll paper sheet P is minimized. Therefore, the near end detection unit 24 is capable of accurately detecting the near end of the roll paper sheet P.

While an embodiment has been described above, this embodiment has been presented by way of example only, and is not intended to limit the scope of the embodiment. The novel embodiment may be implemented in various other forms. Various omissions, substitutions and modifications may be made without departing from the spirit of the embodiment. The claims and the equivalents of the claims are intended to cover this embodiment or the modifications as would fall within the scope and spirit of the embodiment.

For example, in the above-described embodiment, the state in which the printer 1 is inclined by 0° (flatly placed), the state in which the printer 1 is inclined by 45°, and the vertically placed state in which the printer 1 is inclined by 90° are described as examples, but the printer 1 may be provided at any angle from 0° to 90°.

In the embodiment, the printer 1 is described as an example of the paper sheet storage device. However, the embodiment is not limited thereto, and the paper sheet storage device may be a device other than the printer 1. The paper sheet storage device may be, for example, a device built in the printer 1, or may be, for example, a device attached to the printer 1. The paper sheet storage device may be a device attached to a device other than the printer 1.

In the embodiment, it is described that the surface 251 of the wall portion 25 and the surface 261 of the wall portion 26 form the acute angle with each other. However, the embodiment is not limited thereto, and the surface 251 of the wall portion 25 and the surface 261 of the wall portion 26 may face each other at an angle smaller than 180°.

In the embodiment, it is described that the transmission type optical sensor is used as the near end detection unit 24. However, the embodiment is not limited thereto, and the near end detection unit 24 may be, for example, a reflection type optical sensor or a sensor that detects the presence or absence of the outer peripheral portion by physically coming into contact with the outer peripheral portion of the approaching roll paper sheet P. The near end detection unit 24 may be a sensor that detects a core tube of the approaching roll paper sheet P.

What is claimed is:

1. A paper sheet storage device, comprising:

a storage component configured to store a roll of paper sheet comprising a wound long paper sheet, wherein the storage component comprises a first wall portion and a second wall portion spaced apart from one another and arranged to support the roll of paper sheet therebetween;

a near end detector configured to detect a near end as a diameter of the roll of paper sheet stored in the storage component decreases, wherein the near end detector is fixedly arranged at a non-overlapping position with the roll of paper sheet at a maximum of the diameter extending between the first wall portion and the second wall portion, and wherein the near end detector is configured to provide a signal in response to movement of the roll of paper sheet towards the near end detector; and a pressing component configured to press the roll of paper sheet stored in the storage component in a direction of the near end detector.

2. The paper sheet storage device according to claim 1, wherein the pressing component comprises a flapper and a roller provided at a tip portion of the flapper, and in a case where the diameter of the roll of paper sheet is smaller than a threshold diameter, the pressing component presses the roll of paper sheet with the roller.

3. The paper sheet storage device according to claim 1, further comprising:

a lid configured to open and close the storage component, wherein the pressing component is separated from the roll of paper sheet if the lid is opened.

4. The paper sheet storage device according to claim 1, wherein the near end detector detects the near end of the roll of paper sheet by detecting an outer periphery of the roll of paper sheet, and wherein motion of the roll of paper sheet towards the near end detector interrupts a light beam transmitted and received by the near end detector.

5. The paper sheet storage device according to claim 1, wherein the near end detector is configured to detect the near end of the roll of paper sheet as the roll of paper sheet moves towards the near end detector in a direction of gravity regardless of an installation angle of the paper sheet storage device.

6. The paper sheet storage device according to claim 1, wherein the near end detector and the pressing component are arranged such that reduction in the diameter of the roll of paper sheet causes the roll of paper sheet to move into a state overlapping the near end detector.

7. The paper sheet storage device according to claim 1, wherein the near end detector is arranged at least partially outward of an acute angle formed between the first wall portion and the second wall portion.

8. A paper sheet processing method, comprising:

pressing a roll of paper sheet stored in a storage component in a direction of a detecting component, wherein the detecting component is configured to detect a periphery of the roll of paper sheet;

detecting a near end condition, by the detecting component, based on the periphery of the roll of paper sheet being incident upon a light beam transmitted by the detecting component, wherein a reduction in diameter of the roll of paper sheet causing the roll of paper sheet to move in the direction of the detecting component; and detecting the periphery of the roll of paper sheet moving from a first position of non-overlap of the detecting component by the roll of paper sheet, towards the detecting component, and into a second position of overlap of the detecting component by the roll of paper sheet, as a function of gravity.

9. The paper sheet processing method according to claim 8, further comprising:

pressing of the roll of paper sheet comprises a flapper and a roller provided at a tip portion of the flapper, and wherein, in an event of the diameter of the roll of paper sheet is smaller than a threshold diameter, the roller presses against an outer surface of the roll of paper sheet.

10. The paper sheet processing method according to claim 9, further comprising:

in an event of a lid of the storage component is opened, at least one of the flapper or the roller disengages from the roll of paper sheet.

11. The paper sheet processing method according to claim 8, further comprising:

supporting the roll of paper sheet with a first wall portion and a second wall portion, of the storage component, that are spaced apart from one another by the roll of paper sheet, wherein the first wall portion and the second wall portion are aligned to form an acute angle toward the detecting component, and wherein the first wall portion and the second wall portion respectively abut against an outer periphery of the roll of paper sheet therebetween.

12. A thermal printer, comprising:

a thermal print head;

a storage component configured to store a roll of paper sheet comprising a wound long paper sheet;

a near end detector configured to detect a near end condition of the roll of paper sheet, as a diameter of the roll of paper sheet stored in the storage component decreases, wherein the near end detector is arranged at a non-overlapping position with the roll of paper sheet at a maximum of the diameter extending between the first wall portion and the second wall portion, and wherein the near end detector provides a signal in response to movement of the roll of paper sheet into an overlapping position with the near end detector; and a pressing component configured to press the roll of paper sheet stored in the storage component in a direction of the near end detector.

13. The thermal printer according to claim 12, wherein the pressing component comprises a flapper and a roller provided at a tip portion of the flapper, and wherein, in an event of the diameter of the roll of paper sheet is smaller than a threshold diameter, the pressing component presses the roll of paper sheet with the roller.

14. The thermal printer according to claim 12, further comprising:

a lid configured to open and close the storage component, wherein, in an event of the lid being opened, the pressing component is separated from the roll of paper sheet.

15. The thermal printer according to claim 12, wherein the near end detector detects the near end of the roll of paper sheet by detecting an outer periphery of the roll of paper sheet interrupting a beam of light transmitted and received by the near end detector.

16. The thermal printer according to claim 12, wherein the near end detector is configured to detect the near end of the roll of paper sheet as a function of the reduction in diameter of the roll of paper sheet causes the roll of paper sheet to move towards the near end detector under the influence of gravity.

17. The thermal printer according to claim 12, wherein the near end detector and the pressing component are arranged such that reduction in the diameter of the roll of paper sheet causes the roll of paper sheet to move into the overlapping position according to gravity.

18. The thermal printer according to claim 12, wherein the storage component comprises a first wall portion and a second wall portion spaced apart from one another and arranged to support the roll of paper sheet therebetween, and wherein the near end detector is arranged at least partially outward of an acute angle formed between the first wall portion and the second wall portion.

* * * * *